US009570869B2

(12) United States Patent
Buennigmann

(10) Patent No.: US 9,570,869 B2
(45) Date of Patent: Feb. 14, 2017

(54) WIRE-STRIPPING AND CRIMPING PLIERS WITH FORCED LOCK

(71) Applicant: KRAMPE IMMOBILIEN GMBH & CO. KG, Ascheberg (DE)

(72) Inventor: Carsten Buennigmann, Ascheberg (DE)

(73) Assignee: Krampe Immobilien GmbH & Co. KG, Ascheberg (DE)

( * ) Notice: Subject to any disclaimer, the term of this patent is extended or adjusted under 35 U.S.C. 154(b) by 192 days.

(21) Appl. No.: 14/606,051

(22) Filed: Jan. 27, 2015

(65) Prior Publication Data

US 2015/0214685 A1  Jul. 30, 2015

(30) Foreign Application Priority Data

Jan. 27, 2014  (DE) .................... 20 2014 100 340 U

(51) Int. Cl.
*H01R 43/042* (2006.01)
*H01R 43/05* (2006.01)
(Continued)

(52) U.S. Cl.
CPC ............. *H01R 43/0421* (2013.01); *B25B 7/02* (2013.01); *B25B 7/123* (2013.01); *B25B 7/14* (2013.01); *B25B 27/146* (2013.01); *H01R 43/22* (2013.01); *H02G 1/005* (2013.01); *H02G 1/1214* (2013.01); *B25B 7/22* (2013.01); *H01R 43/045* (2013.01); *H01R 43/05* (2013.01); *Y10T 29/5149* (2015.01); *Y10T 29/5151* (2015.01);
(Continued)

(58) Field of Classification Search
CPC ........... Y10T 29/5151; Y10T 29/53222; Y10T 29/53226; Y10T 29/5323; H01R 43/00–43/28; H01G 1/1214; B25B 7/00–7/22
USPC ....... 29/566.4, 750–752, 758; 81/300–427.5; 140/118–120, 149, 121
See application file for complete search history.

(56) References Cited

U.S. PATENT DOCUMENTS 2,279,068 A * 4/1942 Siebrandt ........... A61B 17/8861
                                                 140/121
4,660,241 A * 4/1987 Chen .................... B25B 7/04
                                                 29/566.4
(Continued)

FOREIGN PATENT DOCUMENTS

DE          619302 C   *  9/1935
DE       2521378 A1    11/1976
(Continued)

Primary Examiner — Erica E Cadugan
(74) Attorney, Agent, or Firm — Laurence A. Greenberg; Werner H. Stemer; Ralph E. Locher

(57) ABSTRACT

Wire-stripping and crimping pliers twist a stranded cable end with bars projecting into a pliers mouth at free ends of pliers jaws and crimp a cable end region with a ferrule using a ram guided in a cassette in a pliers legs crossing region and running into a die due to a closing force upon pressing the legs together, to compress the ferrule in the die. First and second moldings on the jaws project into the mouth. A forced lock has a pawl and a toothed segment on the moldings preventing the pliers from opening without the ram previously running against the ferrule. The toothed segment on the first molding has a course corresponding to a movement curve of the jaws. The pawl on the second molding is movable by a spring but fixed in position. The first and/or second molding is formed in one piece with the bars.

9 Claims, 4 Drawing Sheets

(51) Int. Cl.
*B25B 7/02* (2006.01)
*B25B 7/14* (2006.01)
*B25B 27/14* (2006.01)
*H02G 1/00* (2006.01)
*H02G 1/12* (2006.01)
*B25B 7/12* (2006.01)
*H01R 43/22* (2006.01)
*H01R 43/045* (2006.01)
*B25B 7/22* (2006.01)

(52) U.S. Cl.
CPC .... *Y10T 29/53226* (2015.01); *Y10T 29/53478* (2015.01); *Y10T 29/53952* (2015.01)

(56) References Cited

U.S. PATENT DOCUMENTS

| | | | |
|---|---|---|---|
| 4,794,780 A | | 1/1989 | Battenfeld |
| 5,500,998 A | * | 3/1996 | Schmode ........... H01R 43/0421 |
| | | | 29/566.4 |
| 5,611,138 A | | 3/1997 | Krampe |
| 8,429,948 B1 | * | 4/2013 | Warren .................... B25B 7/02 |
| | | | 140/117 |

FOREIGN PATENT DOCUMENTS

| | | | |
|---|---|---|---|
| DE | 4413748 A1 | | 11/1995 |
| DE | 4427553 A1 | * | 2/1996 |
| EP | 0241798 A2 | | 10/1987 |

* cited by examiner

WIRE-STRIPPING AND CRIMPING PLIERS WITH FORCED LOCK

CROSS-REFERENCE TO RELATED APPLICATION

This application claims the priority, under 35 U.S.C. §119, of German Patent Application DE 20 2014 100 340.1, filed Jan. 27, 2014; the prior application is herewith incorporated by reference in its entirety.

BACKGROUND OF THE INVENTION

Field of the Invention

The invention relates to wire-stripping and crimping pliers for twisting a partially exposed end region of a stranded cable using bars projecting into a pliers mouth at free ends of pliers jaws and for crimping the exposed and twisted end region of the stranded cable with a ferrule using a ram guided in a cassette in a crossing region of the pliers legs, with the ram running into a die as a result of a closing force when the pliers legs are pressed together, in order to compress the ferrule located in the die.

A homogeneous, non-releasable connection is produced between a conductor and a connecting element by way of crimping. To that end, crimping pliers for ferrules and crimping pliers for other contacts exist, inter alia, for instance for blade receptacles and blade terminals, for cable lugs and connectors, for optical waveguides and for coaxial connectors. The achieved tensile strength of the connection and the avoidance of typical crimping errors are important quality factors for crimping. Various functions can be integrated in a high-quality tool, for example cutting, wire-stripping, twisting and crimping. In that case, the conductor is cut to the required length by way of a wire-cutting device, one cable end is stripped by way of a wire-stripping device, and the exposed cable end is twisted by way of a twisting device, with the result that safe introduction of the conductor into the ferrule is ensured in order to finally crimp the cable end with the ferrule in a crimping device. As a result of deformation of the ferrule and the fine-wired cable, a gastight connection is produced upon correct execution.

A pliers-like tool of that type is known from German Patent Application DE 44 13 748 A1, corresponding to U.S. Pat. No. 5,611,138. It is important to recognize in that case that the functions for cutting a stranded cable, stripping an end region of the stranded cable, twisting the end region of the stranded cable and crimping the end region of the stranded cable with a ferrule are integrated in those pliers. In that case, the twisting of the partially exposed end region of the stranded cable takes place by way of bars that project into the pliers mouth from the pliers jaws. The crimping of the exposed and twisted end region of the stranded cable with a ferrule takes place by way of a ram, which runs, under the action of the closing force of the pliers, into a die in which the ferrule is located. It has been shown in practice that errors disadvantageously occur during crimping if insufficient force is applied when the pliers are closed or even if the pliers are opened before the die has run against the ferrule located in the die. As a result, the stranded cable is insufficiently compressed and oxygen can reach the individual fine-wired conductors. As a consequence, the contact resistance between the stranded cable and the ferrule increases as a result of corrosion to the individual fine-wired conductors. In addition, there is the risk of an incompletely compressed cable being able to be pulled out of the ferrule.

On the other hand, the crimped connection must also not be pressed excessively in such a way that the cross section of the stranded cable is reduced to an inadmissible extent. As a result, the current-carrying capacity of the connection can be reduced to an inadmissible extent due to the reduced cross section. Furthermore, there is the risk of individual conductors being able to be sheared off or of the ferrule becoming unusable as a result of cracks or fracturing.

European Patent Application EP 0 241 798 A2, corresponding to U.S. Pat. No. 4,794,780, describes pliers for compressing cable lugs, cable connectors and the like with electrical conductors, optical waveguides, etc., having two pliers handles that are movable relative to one another and two pressing jaws that together form a pressing profile. The pliers have a forced lock with a pawl and a toothed segment in order to prevent the pliers from opening without the closed position of the pressing jaws having been reached beforehand. In that case, a pressure lever which is disposed in an articulated manner between the two pliers handles is additionally necessary for the movable but fixed-position mounting of the pawl. The toothed segment by contrast is formed in one piece with the movable pliers handle. Those pliers are merely simple crimping pliers without further functional integration of a wire-cutting device, wire-stripping device and/or twisting device. Furthermore, the configuration of the pressing profile is constructed for crimping cable lugs and cable connectors and is thus unsuitable for crimping ferrules.

German Prosecuted Patent Application DE 25 21 378 B2 describes pliers for compressing cable connectors, cable lugs or the like with electrical conductors, having two pliers legs that are movable relative to one another and two pressing jaws having pressing profiles. The pliers are prevented from reaching dead center and are secured in their closed position by a releasable lock. In that case, the lock is released by elastic deformation of a pliers part carrying the lock when the pliers legs continue to be pressed together. In that case, a spring-loaded pawl of the lock is mounted on the fixed pliers leg and a latch of the lock is formed on the movable pressing jaw. Those pliers, too, are merely simple crimping pliers without further functional integration of a wire-cutting device, wire-stripping device and/or twisting device. Furthermore, the configuration of the pressing profile is constructed for crimping cable connectors and cable lugs and is thus unsuitable for crimping ferrules.

SUMMARY OF THE INVENTION

It is accordingly an object of the invention to provide wire-stripping and crimping pliers which overcome the hereinafore-mentioned disadvantages of the heretofore-known pliers of this general type in such a way that unintentional opening of the pliers during crimping is prevented with the aid of a forced lock and thus permanently high quality and complete compression of stranded cables with ferrules is enabled. Furthermore, the invention is based on the object of integrating the forced lock with the twisting device in order to simplify the production of the pliers.

With the foregoing and other objects in view there is provided, in accordance with the invention, wire-stripping and crimping pliers for twisting a partially exposed end region of a stranded cable using bars projecting into a pliers mouth at a free end of pliers jaws and for crimping the exposed and twisted end region of the stranded cable with a ferrule using a ram guided in a cassette in a crossing region of pliers legs, with the ram running into a die as a result of a closing force when the pliers legs are pressed together, in order to compress the ferrule located in the die. A forced lock has a pawl and a toothed segment for preventing the wire-stripping and crimping pliers from opening without the ram having run beforehand against the ferrule located in the die. In this case, the toothed segment has a course corresponding to a movement curve of the pliers jaws and is disposed on a first molding. The pawl is mounted so as to be movable in a resilient manner by using a spring but fixed in position and is disposed on a second molding. Furthermore, the first molding and the second molding are each disposed on a respective one of the two pliers jaws and project into the pliers mouth, with there being no functional restriction of the wire-stripping device and/or of the twisting device for stripping and twisting the end region of the stranded cable.

In addition, the first molding and/or the second molding are formed as a one-piece unit with the bars for twisting the partially exposed end region of the stranded cable. For example, the corresponding molding may be produced together with the bar in one production step with the aid of a plastics injection-molding method.

The forced lock reliably prevents unintentional opening of the pliers legs during crimping. Consequently, errors during crimping are avoided and additional working time is saved. The forced lock ensures correct execution of a gastight connection of the stranded cable to the ferrule during crimping and also the tensile strength of the connection.

In accordance with another feature of the invention, the toothed segment on the first molding has a multiplicity of teeth which are formed in one piece with the first molding. Moreover, a sliding surface is disposed parallel to the teeth. In addition, the pawl has a pointed corner which engages in a form-locking manner in the teeth of the toothed segment when the pliers legs are pressed together. In addition, the pawl has a nose which slides along the sliding surface of the toothed segment when the forced lock is released. The second molding has a first bearing pin on which the pawl is mounted in a rotatable manner. Furthermore, the second molding has a second bearing pin to which one end of a spring is fastened, the opposite end of the spring being retained in an eye of the pawl. As a result, the detent is disposed in such a way that when the pliers legs are pressed together it slides over the teeth, but is wedged therein in the other direction, so that the pliers legs can no longer be opened. Clicks are audible as the detent slides over the teeth, which supports the easy and error-free operation of the wire-stripping and crimping pliers.

In accordance with a further feature of the invention, as a result of a pressing force when the pliers legs continue to be pressed together, the exposed and twisted end region of the stranded cable is crimped in a known manner with the ferrule and at the same time the pawl runs beyond the toothed segment, in such a way that the forced lock is thus unlocked. The pliers legs can now be opened and the detent slides with the nose over the sliding surface of the toothed segment without audible noises.

In accordance with an added feature of the invention, the user can unlock the forced lock at any time in the event of incorrect operation of the wire-stripping and crimping pliers. To this end, the forced lock is provided with a release device which includes a notch on the second molding and a stop on the pawl in such a way that when a pin is introduced into the notch and the stop is pressed, the forced lock is released. Advantageously, a marking is additionally provided as an operating guide on the notch.

In accordance with a concomitant feature of the invention, the first and second moldings have holes for fastening to the pliers jaws. Suitable bolts or screws are plugged through the holes and are fastened at a predetermined position on the pliers jaws in such a way that the moldings are connected to the pliers jaws.

Other features which are considered as characteristic for the invention are set forth in the appended claims.

Although the invention is illustrated and described herein as embodied in wire-stripping and crimping pliers with a forced lock, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
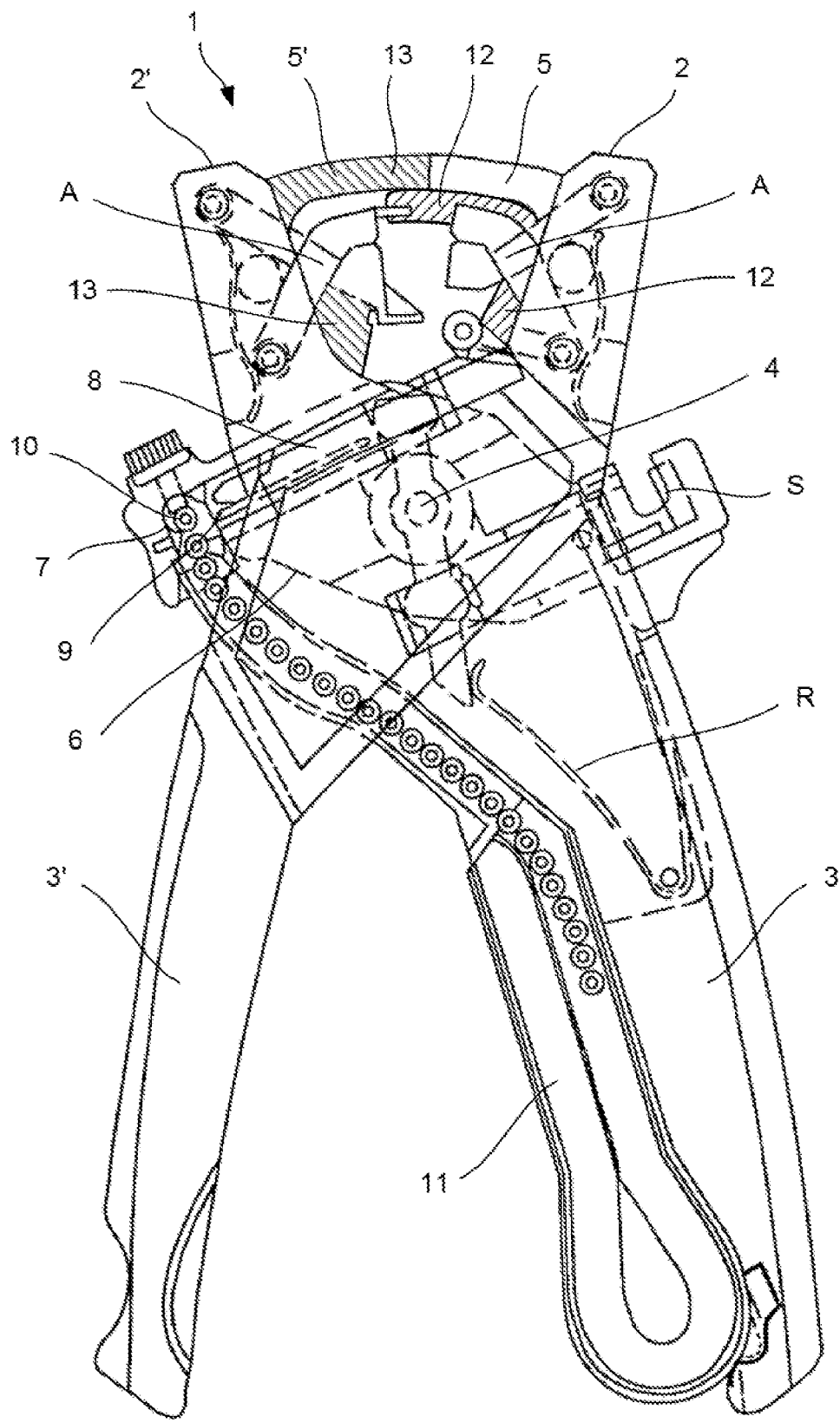
FIG. 1 is a diagrammatic, partly-sectional, plan view of a preferred embodiment of the wire-stripping and crimping pliers according to the invention.

Referring now to the figures of the drawings in detail and first, particularly, to FIG. 1 thereof, there is seen a diagrammatic plan view of a preferred embodiment of wire-stripping and crimping pliers 1 according to the invention. The wire-stripping and crimping pliers 1 are illustrated in this case as a whole and are formed in a known manner of pliers legs 3 and 3' which are joined together by a pin 4. Upper or top-side projections of the pliers legs 3 and 3' above the pin 4 form two pliers jaws 2 and 2'. The pliers jaws 2, 2' are provided with a wire-stripping device A, which includes clamping and cutting elements and a stop for an end region of a stranded cable. A partial exposure or stripping of the end region of the stranded cable takes place in a first step as a result of synchronous pivoting of corresponding cutting jaws and thus also corresponding clamping jaws.

Furthermore, the pliers jaws 2, 2' are provided with a twisting device which includes two bars 5 and 5' having sawblade sections and a channel. By introducing insulation of the stranded cable, which was severed in the first step, into the channel and pressing together the pliers legs 3, 3', fine-wired conductors in the partially exposed end region of the stranded cable are twisted in a second step, and the severed insulation is completely pulled off as far as possible at the same time.

In addition, the pliers jaws 2, 2' are provided with a forced lock 14, which includes first and second moldings 12 and 13 having a pawl 18 and a toothed segment 15. In the illustrated embodiment, the second molding 13 is formed in one piece with the bar 5'. As can be easily seen in FIG. 1, neither the first molding 12 or the second molding 13 of the forced lock 14 results in a functional restriction of the wire-stripping device A and/or of the twisting device with the two bars 5 and 5'.

A magazine 11 for a ferrule belt having a multiplicity of ferrules 10 is retained releasably on the pliers leg 3, in such a way that a first ferrule 10 is pushed until it comes into abutment in a crimping position of a die 7 having a profile which can be adapted to the diameter of the ferrule 10 by an adjusting screw. As a result of introducing the end region of the stranded cable, which was twisted in the second step, into the first ferrule and pressing the pliers legs 3, 3' together, the crimping of the exposed and twisted end region of the stranded cable with the ferrule 10 takes place in a third step. In the process, first of all a blade 9 separates the ferrule 10 from the ferrule belt and then a ram 8 runs into the die 7 as a result of a closing force when the pliers legs 3, 3' are pressed together. The ram 8 is guided in a cassette 6 disposed around the pin 4.

The stranded cable can easily be cut through and to the required length at any time by using a wire-cutting device S. The pliers legs 3, 3' are returned to their starting position with the aid of a restoring spring R.

Figure 2:
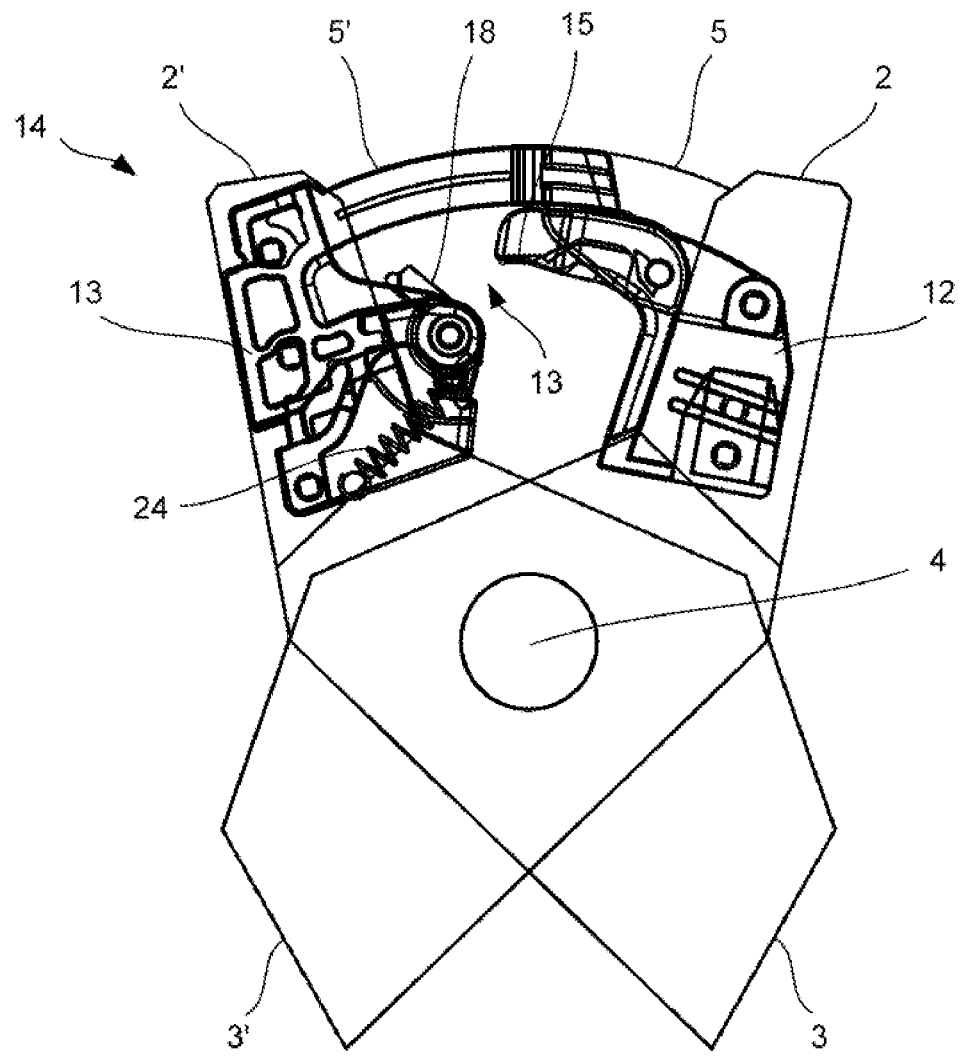
FIG. 2 is a sectional view of a forced lock of the wire-stripping and crimping pliers in a subregion of pliers jaws.

FIG. 2 shows a sectional view of the forced lock 14 of the wire-cutting and crimping pliers 1 in the subregion of the pliers jaws 2, 2'. As described in detail regarding FIG. 1, the forced lock 14 includes a first molding 12 having a toothed segment 15 and a second molding 13 having a pawl 18, which is in turn disposed so as to be movable in a resilient manner by a spring 24 but fixed in position on the second molding 13.

In this case, the first molding 12 is disposed on the pliers jaw 2 and the second molding 13 on the pliers jaw 2'. The second molding 13 forms a unit with the bar 5'. The two pliers jaws 2 and 2' cross at the pin 4 and continue their course in the two pliers legs 3 and 3'.

Figure 3:
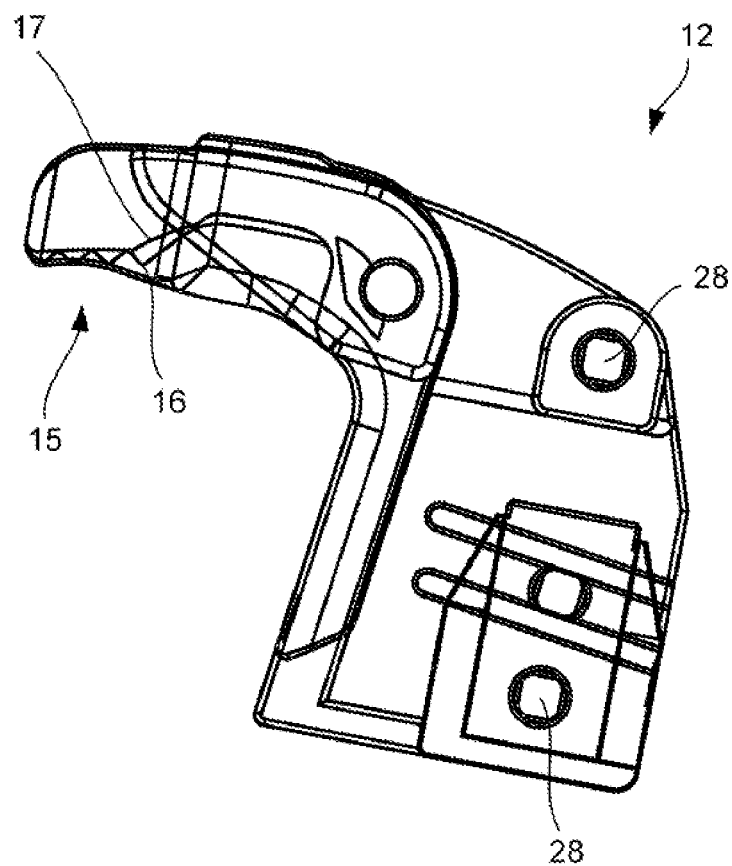
FIG. 3 is an enlarged view of a first molding of the forced lock.

FIG. 3 shows a detailed view of the first molding 12 of the forced lock 14. A free end of the first molding 12 includes the toothed segment 15, which projects into a pliers mouth between the two pliers jaws 2, 2'. In this case, the toothed segment 15 has a course corresponding to a movement curve of the pliers jaws 2, 2'.

The illustrated toothed segment 15 has four teeth 16, parallel to which a sliding surface 17 is disposed. Furthermore, the first molding 12 has three holes 28 for precise positioning on and fastening to the pliers jaw 2.

Figure 4:
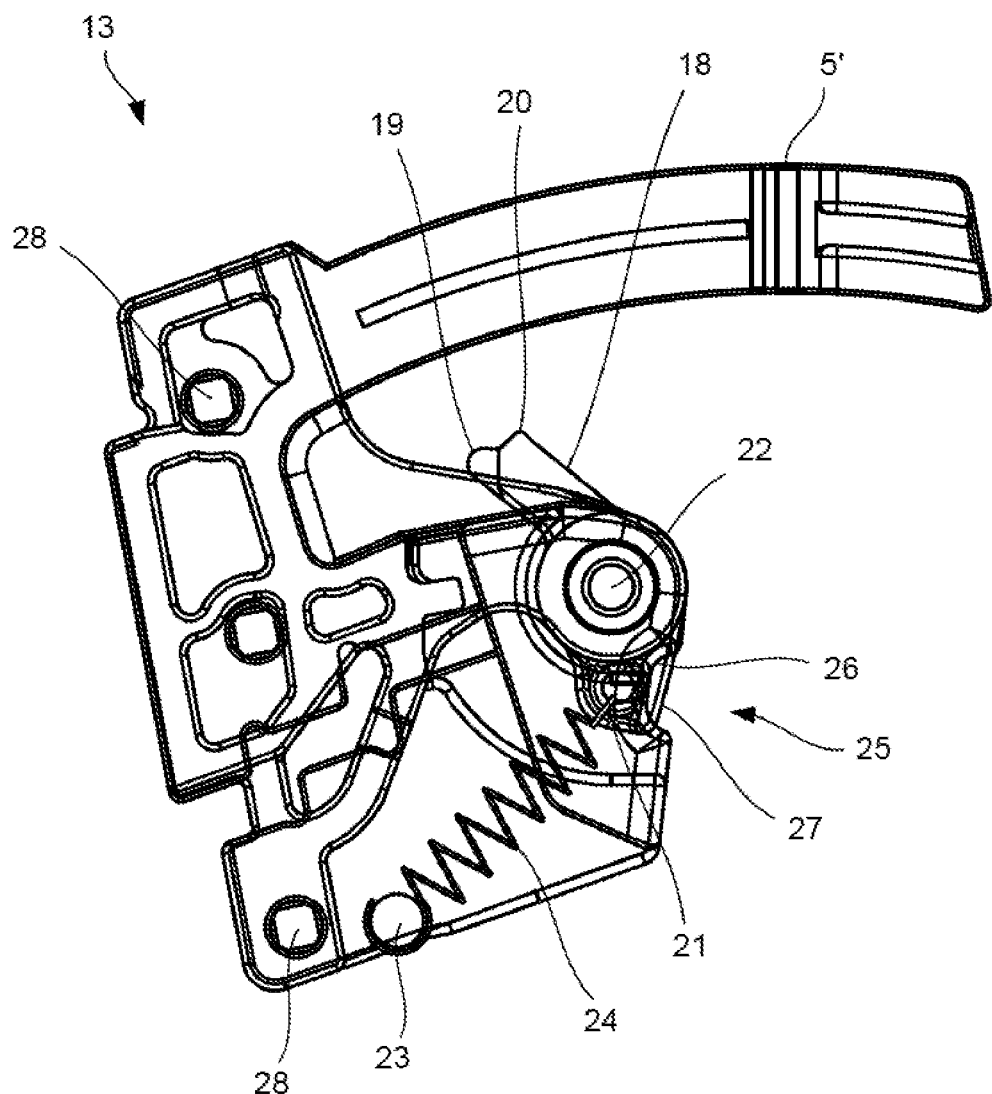
FIG. 4 is an enlarged view of a second molding of the forced lock.

FIG. 4 shows a detailed view of the second molding 13 of the forced lock 14. The second molding 13 has a first bearing pin 22 on which the pawl 18 is mounted in a rotatable manner. Moreover, the second molding 13 has a second bearing pin 23 to which one end of the spring 24 is fastened. The opposite end of the spring 24 is retained in an eye 21 of the pawl 18.

A free end of the pawl 18 has a pointed corner 20 which engages in a form-locking manner in the teeth 16 of the toothed segment 15 on the first molding 12 when the pliers legs 3, 3' are pressed together. In addition, the pawl has a nose 19 which slides along the sliding surface 17 of the toothed segment 15 on the first molding 12 when the forced lock 14 is released.

The forced lock 14 is provided with a release device 25 which includes a notch 26 on the second molding 13 and a stop 27 in the region of the eye 21 on the pawl 18. By introducing a pin into the notch 26 and laterally pressing the stop 27, the forced lock 14 is released.

The top side of the second molding 13 is formed in one piece with the bar 5'. Furthermore, the second molding 13 has the three holes 28 for precise positioning on and fastening to the pliers jaw 2'.

The invention claimed is:

1. Wire-stripping and crimping pliers, comprising:
two pliers legs each having a respective pliers jaw, and the two pliers legs having a crossing region, said pliers jaws having a movement curve, free ends of the pliers jaws defining a pliers mouth and defining bars projecting into said pliers mouth at said free ends for twisting a partially exposed end region of a stranded cable;
a cassette disposed in said crossing region of said pliers legs;
a die for receiving a ferrule;
a ram guided in said cassette and running into said die due to a closing force when pressing said pliers legs together to compress the ferrule located in said die for crimping the exposed and twisted end region of the stranded cable with the ferrule;
first and second moldings each disposed on a respective one of said pliers jaws and projecting into said pliers mouth, at least one of said first or second moldings being formed in one piece with a respective one of said bars;
a forced lock having a pawl and a toothed segment provided on said moldings to prevent the wire stripping and crimping pliers from opening without said ram having run beforehand against the ferrule located in said die;
said toothed segment being located on said first molding and having a course corresponding to said movement curve of said pliers jaws; and
a spring associated with said second molding and said pawl;
said pawl being mounted on said second molding and movable by said spring but fixed in position from translation.

2. The wire-stripping and crimping pliers according to claim 1, wherein said toothed segment has a multiplicity of teeth formed in one piece with said first molding, and has a sliding surface that is disposed parallel to said multiplicity of teeth.

3. The wire-stripping and crimping pliers according to claim 2, wherein said pawl has a pointed corner engaging in a form-locking manner in said teeth of said toothed segment when said pliers legs are pressed together.

4. The wire-stripping and crimping pliers according to claim 2, wherein said pawl has a nose sliding along said sliding surface of said toothed segment when said forced lock is released.

5. The wire-stripping and crimping pliers according to claim 1, wherein said second molding has a first bearing pin on which said pawl is rotatably mounted.

6. The wire-stripping and crimping pliers according to claim 1, wherein said pawl has an eye, said spring has opposite ends, said second molding has a bearing pin, one of said ends of said spring is fastened to said bearing pin and the other of said ends of said spring is retained in said eye of said pawl.

7. The wire-stripping and crimping pliers according to claim 1, wherein said pawl runs beyond said toothed segment as a result of a pressing force when said pliers legs continue to be pressed together beyond when said pawl engages teeth of said toothed segment, and said forced lock is thereby unlocked.

8. The wire-stripping and crimping pliers according to claim 1, wherein said forced lock has a release device including a notch on said second molding and a stop on said pawl for releasing said forced lock when a pin is introduced into said notch and said stop is pressed.

9. The wire-stripping and crimping pliers according to claim 1, wherein said first and second moldings each have respective holes for fastening the respective first and second moldings to said pliers jaws.

* * * * *